(12) United States Patent
Nakajima

(10) Patent No.: US 6,487,165 B1
(45) Date of Patent: Nov. 26, 2002

(54) OPTICAL RECORDING MEDIUM

(75) Inventor: Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 09/596,483

(22) Filed: Jun. 19, 2000

(30) Foreign Application Priority Data

Jun. 22, 1999 (JP) .......................................... 11-174915

(51) Int. Cl.⁷ ................................................ G11B 7/24
(52) U.S. Cl. .................................. 369/275.4; 428/64.4
(58) Field of Search .......................... 369/275.4, 275.2, 369/275.3, 272, 273; 428/64.1, 64.4; 430/320, 321

(56) References Cited

U.S. PATENT DOCUMENTS

| 5,581,539 A | * | 12/1996 | Horie et al. ............. 369/275.4 |
| 5,666,345 A | * | 9/1997 | Takahashi et al. ........ 369/275.1 |
| 5,737,307 A | * | 4/1998 | Shimizu .................. 369/275.4 |
| 5,926,446 A |   | 7/1999 | Shimizu |
| 6,118,752 A | * | 9/2000 | Miyagawa et al. ....... 369/275.3 |
| 6,262,968 B1 | * | 7/2001 | Miyamoto et al. ....... 369/275.4 |

FOREIGN PATENT DOCUMENTS

| JP | 5120733 | 5/1993 |
| JP | A-9-245350 | 9/1997 |

* cited by examiner

Primary Examiner—Tan Dinh
(74) Attorney, Agent, or Firm—Edwards & Angelll, LLP; David G. Conlin; William J. Daley, Jr.

(57) ABSTRACT

In an optical recording medium in which marks are allowed to be written at grooves and information has been recorded beforehand in the form of prepits in a prepit area, the medium is constructed so that the groove width, Wg, the land width, Wl, and the prepit width, Wp, satisfy the relationships of either Wl<Wg, and Wp<Wg, or Wl>Wg, and Wp>Wg. Alternatively or additionally to the above, a sum of lengths of pit-presence portions in the prepit area is larger than a sum of lengths of pit-absence portions in the prepit area.

4 Claims, 5 Drawing Sheets

RECORDING AREA    PREPIT AREA    RECORDING AREA

OPTICAL RECORDING MEDIUM

BACKGROUND OF THE INVENTION

The present invention relates to recordable (once-writable) and rewritable information-recording media, and more particularly, to optical discs.

Recently, the densification of such optical discs, which are used as recording devices for computers, or package media for music and image information, has been advanced. In order to have precise, high-speed access to such high-density tracks, it is necessary to provide preformatted signals having address information to a recording surface of the optical disc, to and from which surface information is recorded and reproduced. Further, information that one does not want to erase can also be formed in advance as preformatted signals on the disc. Portions other than the preformatted portions are a recording area in which guide grooves referred to as simply 'grooves' are formed. In the groove area, namely, in the recording area, grooves that are concave portions and lands that are not concave portions exist.

FIGS. 5A and 5B show a disc of related art, and are a top view and a perspective view of the disc, respectively. In FIG. 5B, a cross section of the disc is also shown. Reference symbols 'G' and 'L' indicate a groove and a land, respectively. Reference symbol 'PP' indicates a prepit. Light 3 (typically, a laser beam) is condensed by a lens 2 and then incident through a substrate 1. Comparing the land with the groove, the groove is nearer to the lens 2.

A recording layer of a material represented by a magneto-optical material, a phase-change material or an organic dye material is formed (not shown in the figures) on the lands, grooves, and prepits. In the figures, a recording mark M is written in the groove. This is because better signals in quality are obtained when the information is written in the grooves than when written on the lands.

When recording/reproducing information onto/from the optical disc on which the guide grooves are formed as described above, tracking servo control is implemented by a push-pull method using a servo control signal called the 'push-pull signal' resulting from the diffraction of light at the grooves and prepits. A light beam ('beam spot') condensed by the lens 2 tracks on the grooves and prepits.

Generally, the push-pull signal in the prepit area has a smaller amplitude than the push-pull signal in the groove area. The reason for that is as follows. The structure of the prepit area in which concave portions are spaced from each other is equivalent to the structure of a broken, or discontinuous groove. Therefore, in the prepit area, due to the discontinuity of the concave portions, the amount of diffraction of light is reduced accordingly on the average. This is why that the amplitude of the push-pull signal is smaller in the prepit area than in the groove area.

Accordingly, if the gain of the tracking servo control is adjusted so that it is suitable for the groove area, the amplitude of the push-pull signal in the prepit area becomes too small. Therefore, the gain of the tracking servo control is relatively small for the prepit area, and the control precision deteriorates. In contrast, if the gain of the tracking servo control is adapted to the prepit area, the amplitude of the push-pull signal in the groove area becomes excessively large. Thus, disadvantageously, oscillation occurs in the tracking servo system.

SUMMARY OF THE INVENTION

The present invention has been made in order to solve the above problems, and the object of the present invention is to provide a highly reliable optical recording medium with a prepit area wherein recording is implemented at least at grooves, and push-pull signals obtained in a groove area (recording area) and a prepit area have similar magnitudes so that precise tracking can be implemented without deterioration of control precision nor occurrence of oscillation of the tracking servo control system, whereby complication of the circuitry of a recording/reproducing device and the increase of the costs of such a device can be avoided.

In order to accomplish the above object, according to an aspect of the present invention, there is provided an optical recording medium, comprising a substrate having a recording area, composed at least of lands and grooves, and a prepit area in which information has been recorded beforehand in the form of prepits, the recording area being recordable at least at the grooves among the lands and grooves, the optical recording medium being constructed such that a width of each groove, Wg, a width of each land, Wl, and a width of each prepit, Wp, satisfy the following relationships of:

either $Wl<Wg$, and $Wp<Wg$, or $Wl>Wg$, and $Wp>Wg$.

With this arrangement, the amplitudes of the push-pull signals from the recording area (groove area) and the prepit area can be made equivalent to each other or little different from each other. Thus, it becomes possible to achieve accurate tracking servo control. Accordingly, there is an effect that it is possible to prevent the complication of the circuitry and the cost increase of a recording/reproducing apparatus for the optical recording medium.

According to another aspect of the present invention, there is provided an optical recording medium, comprising a substrate having a recording area, composed at least of lands and grooves, and a prepit area in which information has been recorded beforehand in the form of prepits, the recording area being recordable at least at the grooves among the lands and grooves, wherein a sum of lengths of pit-presence portions in the prepit area is larger than a sum of lengths of pit-absence portions in the prepit area.

The inventor of this invention has found that by increasing duty of prepits (also referred to as simply 'pits') which is calculated from (the sum of lengths of the pit-presence portions in the prepit area)/(the sum of lengths of the pit-presence portions and pit-absence portions in the prepit area), it is possible to increase the amplitude of the push-pull signal from the prepit area. The optical recording medium with this arrangement has duty of prepits of more than 50%. Thus, even if the prepit width is same as the groove width so that there is a difference in amplitude of the push-pull signal between the groove area and the prepit area, the difference can be decreased. As a result, it is possible to achieve accurate tracking servo control. Furthermore, because the same width can be used for the grooves and the prepits for the above reason, the optical recording medium can be simply fabricated.

The above characteristic features of the first and second aspects of the present invention may be combined so that not only the widths of the grooves and prepits but also the duty of prepits are changed. In this case, freedom is increased in designing the optical recording medium such that there is no difference or little difference between the amplitudes of the push-pull signals from the groove area and the prepit area.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a concrete example to which the present invention has been applied and a comparative example will be described in detail with reference to the drawings.

Using an optical system comprising a laser beam having a wavelength of 650 nm and a lens with an NA (numerical aperture) of 0.6, experiments were conducted on discs having various groove widths, Wg, and prepit widths, Wp, at a tracking pitch (the distance between grooves, namely, Wg+Wl) of 0.74 μm.

The grooves G and prepits PP each have a depth of 30 nm. For the recording layer, GeSbTe, which is a phase-change material, was used. Each disc was rotated at a linear velocity of 3.5 m/s for recording and reproducing.

[Embodiment 1]

Embodiment 1 is described below with reference to FIGS. 1 and 2.

Discs having different groove widths, Wg, land widths, Wl, and prepit widths, Wp, (see FIG. 1) were first prepared, with their groove depths and prepit depths fixed to the above-mentioned values, respectively. Then, a test of these discs was carried out to measure the amplitudes of the push-pull signals from the groove area (namely, recording area) and the prepit area.

Figure 1:
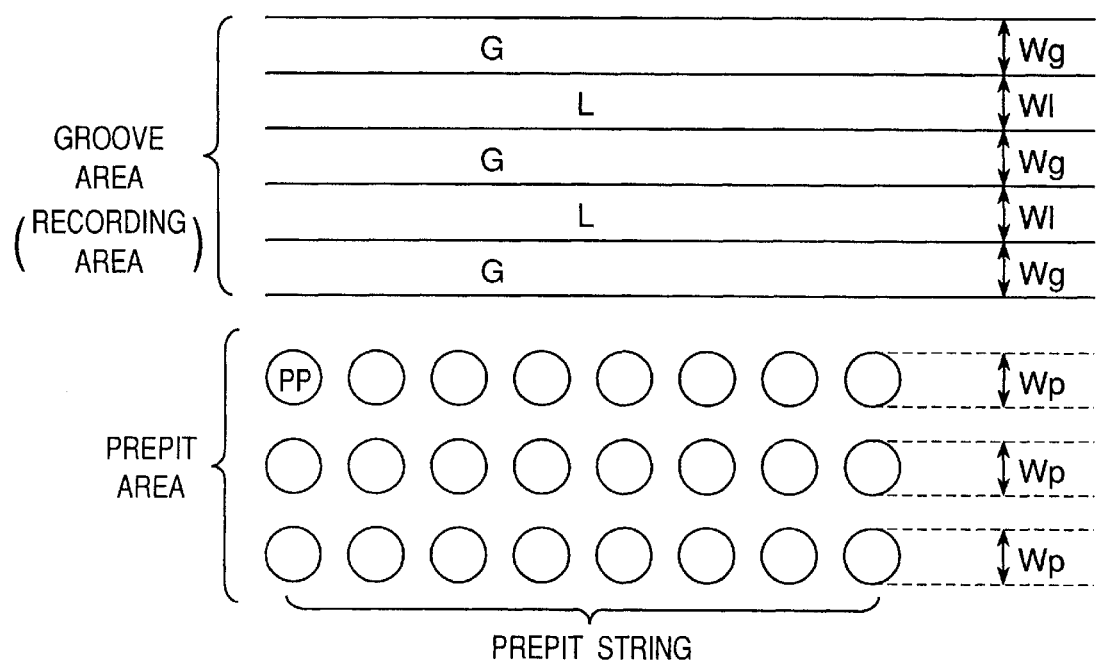
FIG. 1 is an illustration explaining a disc having a groove area and a prepit area according to the present invention

FIG. 1 is an explanatory illustration showing a part of an optical disc prepared. As shown in this figure, the groove area includes alternate grooves G and lands L, and the prepit area includes strings of prepits PP (referred to also as simply 'pits'). The grooves/lands define concentric circles or a helix together with the prepit strings, although not shown in the figures.

In the test, amplitudes of push-pull signals were measured when a light beam spot traversed the prepit area and the groove area arrayed as shown in FIG. 1 on the individual discs. (Note here that the sum of Wg and Wl defines a track pitch and was constant at a value of 0.74 μm in this embodiment.)

Figure 2:
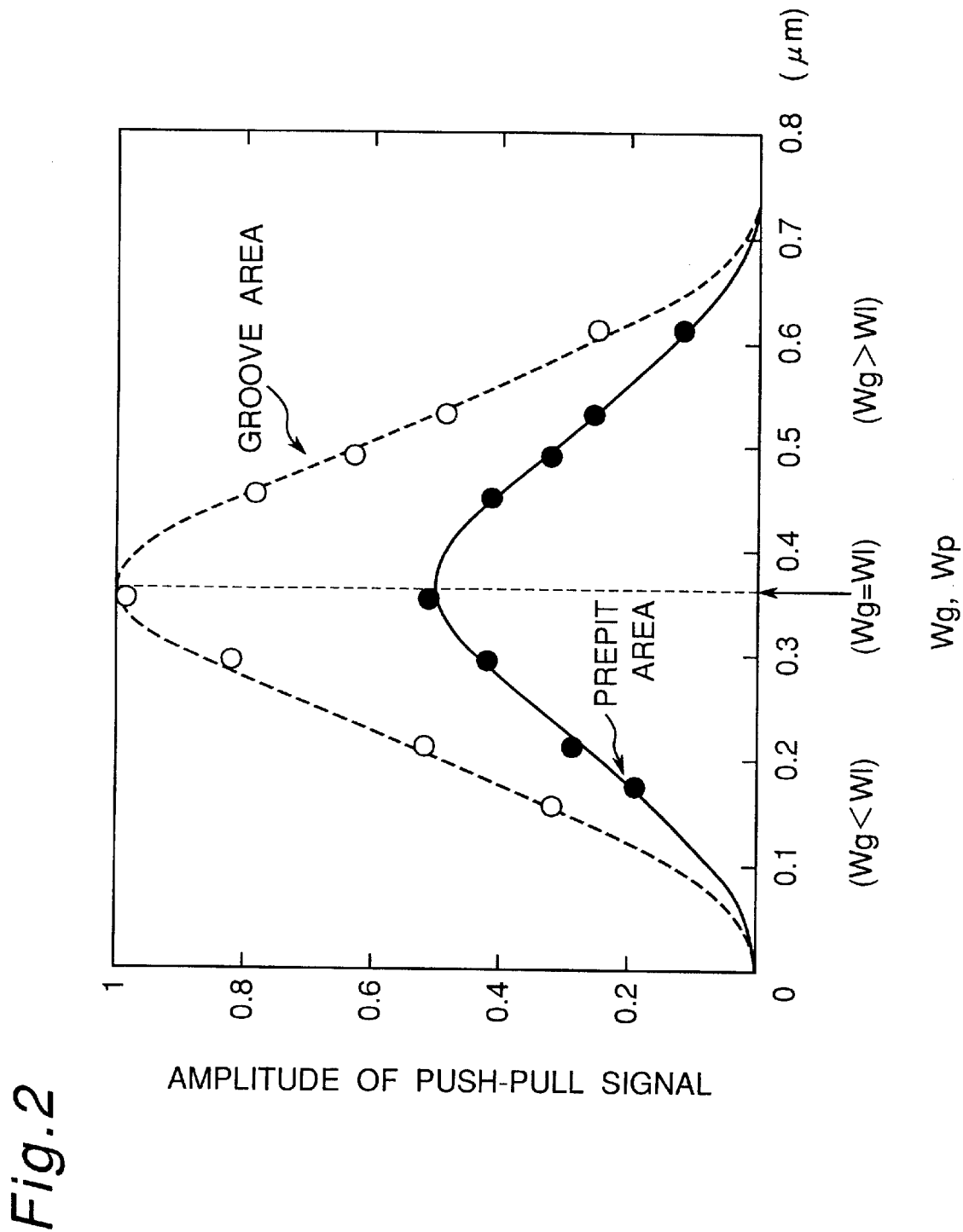
FIG. 2 is a graph showing the relationship between the groove/prepit widths and the amplitude of the push-pull signal in the optical recording medium of the present invention.

FIG. 2 is a graph showing the measurement results. In the graph, the axis of abscissas indicates the groove width, Wg, and the prepit width, Wp, and the axis of ordinates indicates the amplitude of the push-pull signal for Wg and Wp.

The biggest push-pull signal amplitude was obtained from the groove area when Wg=Wl=0.37 μm. For this reason, the values of the amplitude of the push-pull signal have been normalized, using, as a value of 1, the amplitude of the push-pull signal obtained from the groove area when Wg=Wl=0.37 μm, and the axis of ordinates of FIG. 2 is scaled accordingly. Again, the sum of Wg and Wl was 0.74 μm, as described before. In addition, the discs tested were under condition that a distance between center lines of adjacent prepit strings, namely, a pitch in an axial direction of the prepits, was also constant at 0.74 μm, which value was equal to the sum of Wg and Wl.

Naturally, it is one of conditions that should be avoided that the prepit width, Wp, is equal to or larger than the sum of Wg and Wl (a track pitch: 0.74 μm in this example). This is because if so, the adjacent prepit strings will touch or overlap each other.

As is obvious from FIG. 2, when Wg=Wp, the amplitude of the push-pull signal is smaller in the prepit area (indicated with solid line in the figure) than in the groove area (indicated with broken line in the figure), and generally the former is about half the latter. This difference in the push-pull signal amplitude between the prepit area and the groove area has caused the above-mentioned problem relating to the tracking servo control. FIG. 2, however, indicates that such a problem can be solved by making the groove width, Wg, different from the prepit width, Wp.

Let us consider this by way of example. If the groove width, Wg, is 0.22 μm, the push-pull signal of the groove area has an amplitude of 0.5 after normalized. A similar amplitude is provided by a push-pull signal derived from the prepit area when the prepit width, Wp, is 0.37 μm. Therefore, if an optical disc (an optical recording medium) is formed such that Wg=0.22 μm, Wp=0.37 μm, and that Wl=0.52 μm (this value is obtained from Wg+Wl=0.74 μm), it follows that push-pull signals having similar amplitudes will be obtained both from the groove area and from the prepit area.

In addition, if Wg=0.53 μm, Wp=0.37 μm, and Wl=0.21 μm (this value is obtained from Wg+Wl=0.74 μm), push-pull signals from the groove area and the prepit area will also have similar amplitudes.

There are other combinations of Wg, Wp, and Wl that allow the push-pull signals from the groove area and the prepit area to have almost equal amplitudes, or slightly different amplitudes. Such combinations exist under the following formularized conditions:

$$Wl > Wg, \text{ and } Wp > Wg,$$

or alternatively, $$Wl < Wg, \text{ and } Wp < Wg$$

[Embodiment 2]

Figure 3:
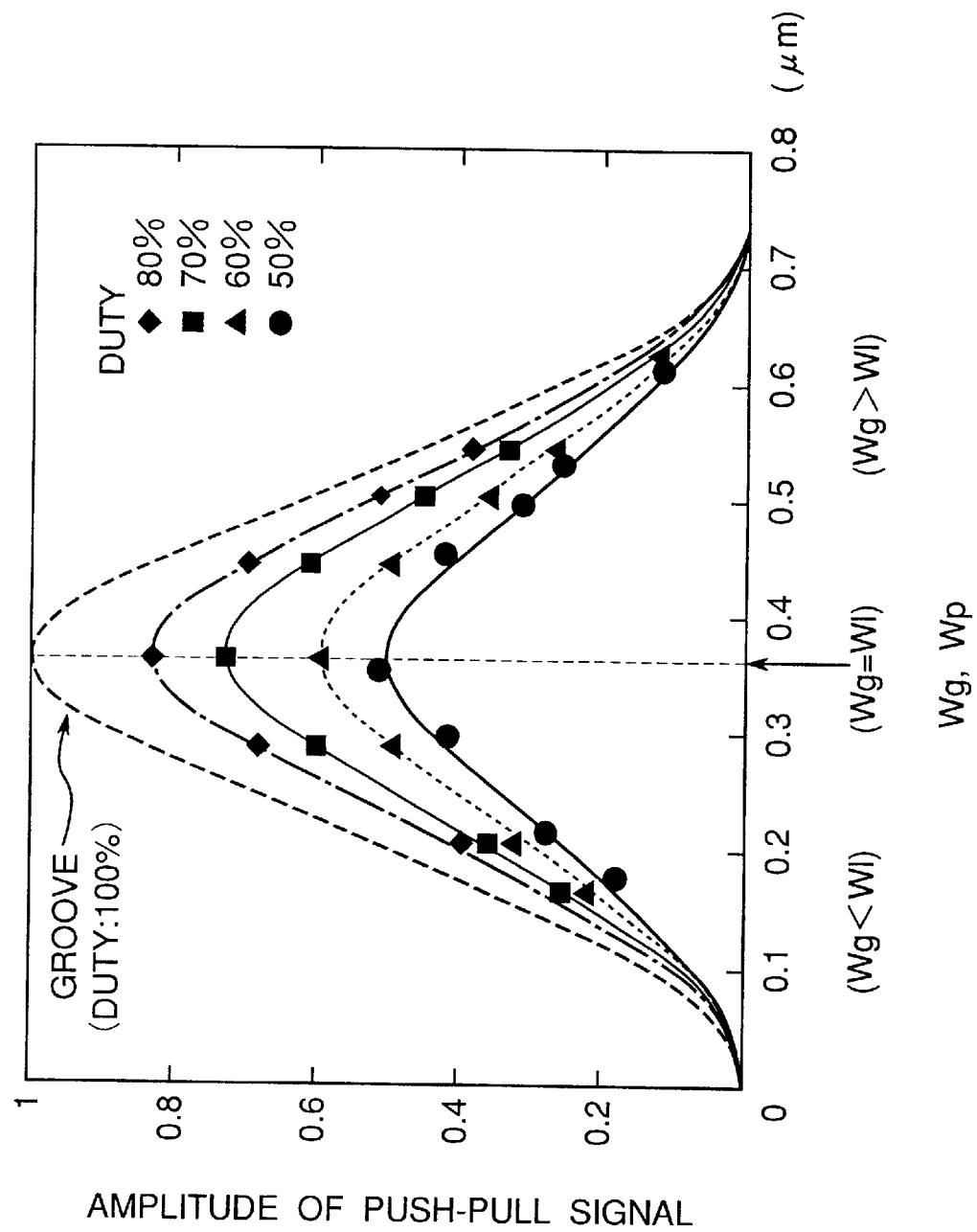
FIG. 3 shows a graph showing the relationship between the groove/prepit widths and the amplitude of the push-pull signal for different duties of pits in the prepit area in the optical recording medium of the present invention.
Figure 4:
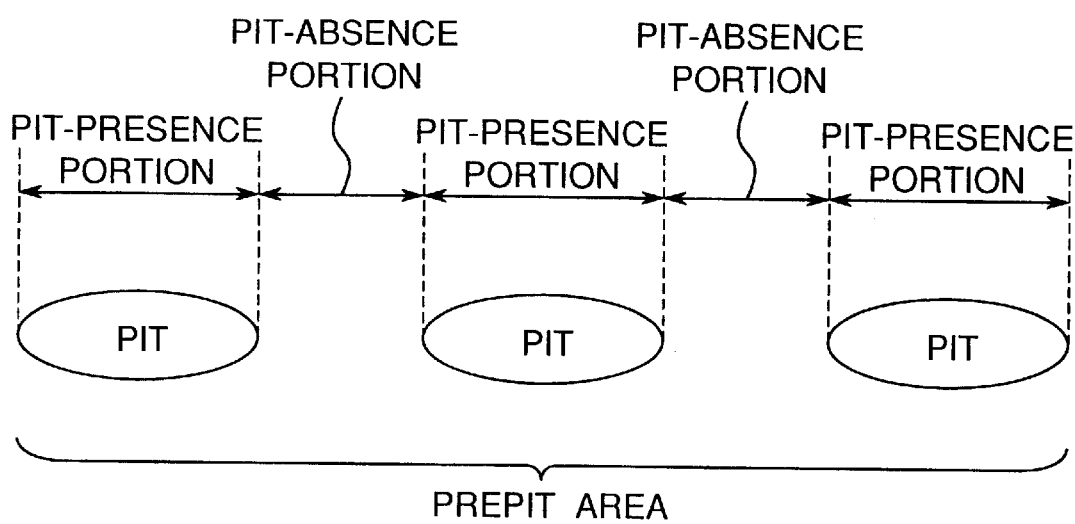
FIG. 4 is an illustration for explaining the duty of pits in the prepit area of the optical recording medium according to the present invention.
Figure 5A:
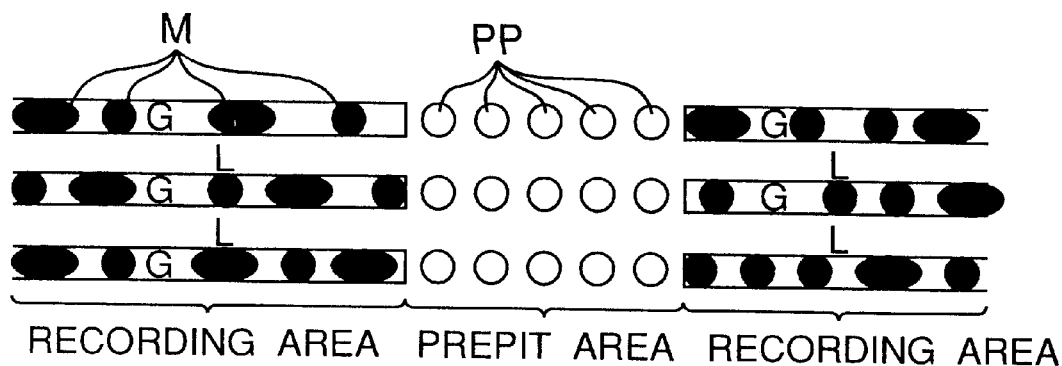
FIGS. 5A and 5B schematically show an optical recording medium according to related art.
Figure 5B:
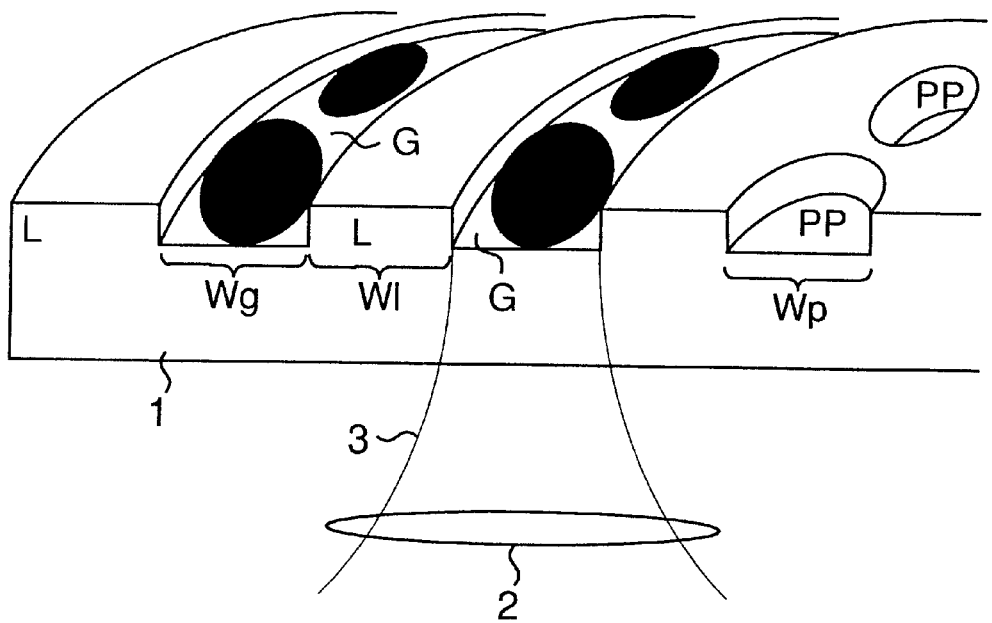

Various optical discs were prepared by changing the duty of the prepit area while maintaining the prepit width, Wp, at a constant value (0.37 μm). Then, amplitudes of push-pull signals of the optical discs were measured. FIG. 3 shows the measurement results.

The 'duty' here means a rate of occupation of pit-presence portions in the prepit area, and is calculated from (the total length of the pit-presence portions)/(the sum of the total length of the pit-presence portions and the total length of the pit-absence portions). As is obvious from FIG. 3, the larger the duty, the larger the push-pull signal. The duty of 100% of the prepit area represents the state in which pits are not separated from each other, or rather a single pit extends continuously. In other words, the prepit area having the duty of 100% is equivalent to the groove, and this value of the duty allows a push-pull signal to have the largest amplitude.

In Embodiment 2, the prepit width, Wp, is 0.37 μm (the track pitch is 0.74 μm as in Embodiment.). Even if the prepit width, Wp, is changed from this value, there remains the inclination that the larger duty provides the larger amplitude of the push-pull signal, although the maximum value of the amplitude depends on the prepit width. The axis of ordinates of the graph in FIG. 3 indicates normalized values of amplitudes of the individual push-pull signal derived from various duties at the given prepit width, Wp, (0.37 μm in this case), wherein normalization has been done using, as a value of 1, the amplitude of the push-pull signal derived from the duty of 100%.

In Embodiment 1, description has been made of a technique of making the groove width, Wg, and the prepit width, Wp, different from each other to obtain push-pull signals of almost same amplitudes in both the groove area and the prepit area.

On the other hand, it is understood from FIG. 3 of Embodiment 2 that changing the duty of prepits allows the amplitude of the push-pull signal in the prepit area to be changed. That is, even when the groove width, Wg, is equal to the prepit width, Wp, a difference in the amplitude of the prepit signal between the prepit area and the groove area can be reduced by appropriately changing the duty of the prepit area. More specifically, the duty of the prepit area should be increased.

According to the technique of Embodiment 2, although the duty of pits is changed, the prepit width, Wp, can be the same as the groove width, Wg. Therefore, the optical discs (optical recording media) of the present embodiment can be simply fabricated.

The pit width may be, of course, designed to be different from the groove width, as in Embodiment 1.

When adopting such a design, parameters for balancing the amplitude of the push-pull signal in the groove area with that of the push-pull signal in the prepit area include not only the pit width and the groove width, but also the duty of pits. As a result, freedom of design increases, as compared with the technique of Embodiment 1.

The above embodiments have been explained in connection with only the optical discs (optical recording media) in which data are recorded only at grooves. It is also possible to record data on lands besides the grooves, and thus the present invention is applicable to so-called land-groove recording discs. Note that the above discussion holds true for the push-pull signal derived from the land because the push-pull signal derived from the land has the same amplitude as that of the push-pull signal derived from the groove, although the phase of the signal is reversed. Similarly, the above discussion holds true for the push-pull signal derived from between the prepit strings because the push-pull signal derived from between the prepit strings has the same amplitude as that of the push-pull signal derived from the prepit string, although the phase of the signal is reversed.

Further, in the above embodiments, an optical system having a wavelength of 650 nm and a numerical aperture (NA) of 0.6 is used. It is evident, however, that the effects of the present invention are not limited by the optical system. Furthermore, the track pitch, the groove width and the prepit width are not limited to the values shown above. Needless to say, following the gist of the present invention, it is possible to arrange various combinations of widths within the range as set forth in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium, comprising a substrate having a recording area, composed at least of lands and grooves, and a prepit area in which information has been recorded beforehand in the form of prepits, said recording area being recordable at least at the grooves among said lands and grooves, the optical recording medium being constructed such that a width of each groove, Wg, a width of each land, Wl, and a width of each prepit, Wp, satisfy the following relationships of:

either Wl<Wg, and Wp<Wg, or Wl>Wg, and Wp>Wg.

2. An optical recording medium according to claim 1, wherein a sum of lengths of pit-presence portions in said prepit area is larger than a sum of lengths of pit-absence portions in said prepit area.

3. An optical recording medium, comprising a substrate having a recording area, composed at least of lands and grooves, and a prepit area in which information has been recorded beforehand in the form of prepits, said recording area being recordable at least at the grooves among said lands and grooves, wherein a sum of lengths of pit-presence portions in said prepit area is larger than a sum of lengths of pit-absence portions in said prepit area.

4. An optical recording medium according to claim 3, wherein a groove width, Wg, is same as a prepit width, Wp.

* * * * *